TIME DIVISION ELECTRONIC MODULAR MATRIX SWITCHING SYSTEM

Filed June 3, 1966 6 Sheets-Sheet 1

INVENTOR.
ALLAN A. KUNZE
BY Harry A. Herbert Jr. and Julian L. Siegel
ATTORNEYS

INVENTOR.
ALLAN A. KUNZE
BY Harry A. Herbert Jr. and
Julian L. Siegel
ATTORNEYS

PAM MODULAR CONSTRUCTION

INVENTOR.
ALLAN A. KUNZE
BY Harry A. Herbert Jr. and
Julian L. Siegel
ATTORNEYS

PCM MODULAR CONSTRUCTION

INVENTOR.
ALLAN A. KUNZE
BY Harry A. Herbert Jr. and
Julian L. Siegel
ATTORNEYS

INVENTOR.
ALLAN A. KUNZE

BY Harry A. Herbert Jr
Julian L. Siegel
ATTORNEYS

INVENTOR.
ALLAN A. KUNZE
BY Harry A. Herbert Jr
Julian L. Siegel
ATTORNEYS

United States Patent Office 3,399,387

Patented Aug. 27, 1968

3,399,387
TIME DIVISION ELECTRONIC MODULAR MATRIX SWITCHING SYSTEM

Allan A. Kunze, Rome, N.Y., assignor to the United States of America as represented by the Secretary of the Air Force Filed June 3, 1966, Ser. No. 555,937
4 Claims. (Cl. 340—172.5)

The invention described herein may be manufactured and used by or for the United States Government for governmental purposes without payment to me of any royalty thereon.

This invention relates to a time sharing switching system and more particularly to a system using integrated logic and control.

Time division switching is based on the fact that information contained in a continuous wave can be transformed into discrete pulses of varying amplitude, provided that there is at least one discrete pulse sample for each half wave of signal. A continuous signal with an associated spectrum in the low-pass region or voice signal is applied to a low-pass filter to prevent any components greater than half of the sampling frequency from passing in order to prevent distortion. This band limited signal is then sampled at a rate equal to at least twice the maximum signal component present. If the time slots for this gated interval are correctly chosen, a number of incoming signals may be time division multiplexed into a common connecting bus or highway.

Proper selection of time slots will connect the called and calling party, such that the desired stream of pulses established at the input will be transmitted along the highway and arrive at the desired destination. If this stream of pulses is then passed through a low-pass filter identical with that at the input, the called party will receive an analog or voice signal duplicating that applied at the sending terminal.

In most present applications of time division switching, time slots are assigned randomly as available for each connection but the input line gate and the output line gate must operate in the same time slot to effect a particular circuit connection.

The present invention is a time division electronic non-blocking switching system in which the processing logic, control and switching memory are integrated, and along with the switching matrix form a basic multi-line switching module, the coordinate position of each input line expressed as BCD (binary coded decimal) address $x, y, z$, where $x$ represents the number of the module and $y, z$ the line position. This corresponds directly to the output line address where $x$ is the highway and $y, z$ is the time slot position in that highway. A common recirculating address reference register synchronously reading out addresses from 1 to 100 is used to translate from BCD addresses to the corresponding time slot and vice versa enabling the use of time in identifying call processing functions.

Scanning the incoming lines sequentially to determining signalling indications also gates the correspoding output lines in their fixed address time slots. The cross-point switches in the switching matrix are closed by congruant control pulses from the recirculating address switching register which stores appropriate signal information in the same time slot. Hence, only a single recirculating register is required in each module.

For a thousand-line system of 10 modules all control is effected over three sets of control cables of 10 wires each. This permits modular expansion up to 10,000 lines in increments of 100 lines but by simply paralleling highways and up to 4 sets of 10 control wires. The integrated logic associated with each switching module processes each call in its associated time slot so that individual logic elements can be shared sequentially among many calls. All transfer of address and control data is accomplished in the time slot in which the information is to be processed in the receiving module and on the specific transfer bus belonging to the receiving module. Thus the use of specific time slots ordinarily identifies the data anywhere in the system for all calls without the multitudinous markers and memories normally associated with time division switches. The system can incorporate transition from analog to digital switching, integrated voice and message switching, and such features as priority control, concentrators, conferencing, non-hierarchical long distance switching, hot line, automatic change of address, time assignment speech interpolation (TASI), saturation signalling, and others.

An object of this invention is therefore to provide a non-blocking time shared switching system in which the input coordinate address corresponds to the output address so time can be used to identify processing functions.

It is another object to provide time shared switching system in which cross control permits simplified modular expansion.

It is still another object to provide a time shared switching system permanently assigned time slots instead of randomly selected time slots, thereby simplifying signalling and control.

It is yet another object to provide a time division switching system in which the logic, control and cross-point switching memory are integrated with the switching matrix and in an expandable modular configuration.

Yet another object is to provide a time division switching system using unique address time slots and integrated modular construction to simplify control of a multiplicity of cross-point gates in a switching matrix by means of congruency of two or more pulses.

It is still another object to provide a time division switching system having a modular switching matrix construction incorporating control of switch points by time slot gating for enabling modular expansion by paralleling highway and control wires.

It is still another object to provide a time division switching system using a congruant time slot principle to simplify the input line scanner and output gating functions of the switching markers.

It is still another object to provide a time division switching system having modular construction that permits the evolutionary transition from PAM to PCM transmission by the substitution of a single buffer deck for a filter deck in each module.

It is still another object to provide a time division switching system using time slots as separate unique address designators to keep track continuously of all processing control and information operations without the requirements for additional memories, markers, supervision directors, and programmers.

It is still another object to provide a time division switching system using unique address time slots permitting the sharing of logic elements among all calls being processed simultaneously within a module.

These and other advantages, features and objects of the invention will become more apparent from the following description taken in connection with the illustrative embodiments in the accompanying drawings, wherein:

FIGURES 1*a* and 1*b* show the modular construction incorporated in this invention;

Figure 1A:
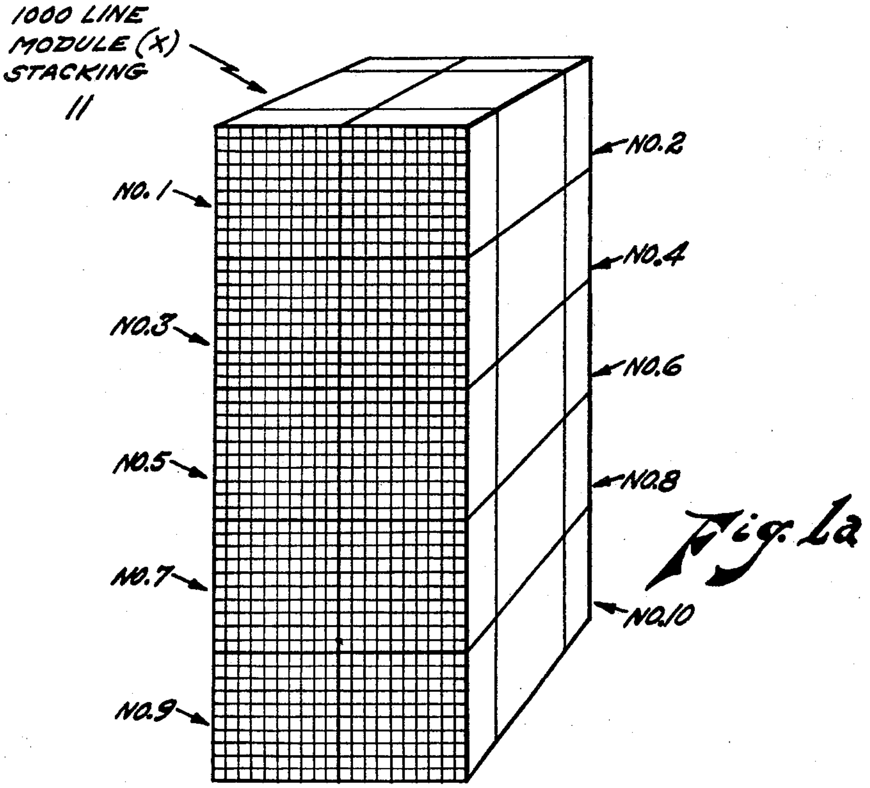

One embodiment of the invention as shown in FIGURE 1*a* subdivides a 1000-line switching matrix into 10 individual modules, with each individual module containing 10 separate decks of 10 lines. However, it is understood that a different number of modules and lines and decks within these modules can also be used.

Figure 1B:
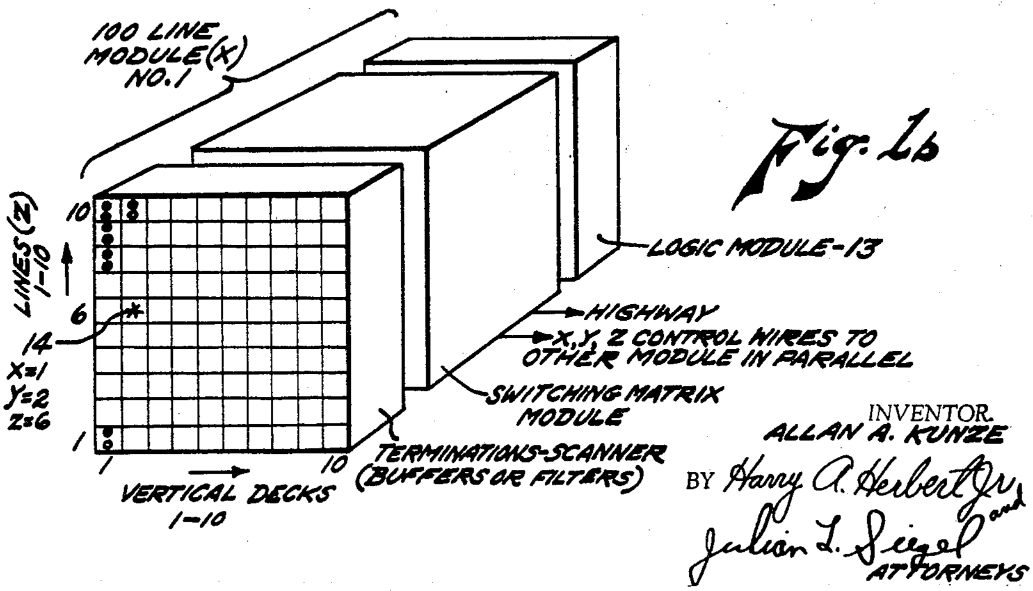

The address of the incoming party corresponds to the physical position the line occupies in a switchboard. That is, the address for the incoming party is *x*, the number of the module (1 to 10); *y*, the number of the deck within that module (1 to 10); and *z*, the number of the line in the deck (1 to 10). As an example, the address 126 is shown at 14 of FIGURE 1*b* and represents module 1, deck 2, and line 6.

The system can be expanded without too much complexity to a 10,000 line system containing 100 modules and 100 highways numbered *wx* instead of just *x*.

Integrated logic is associated with each module shown at 13 and output highway. The binary output of address registers in the logic are converted to decimal by analog to digital converters for use in controlling the TDM resonant transfer cross point gates in the switching matrix.

Time sampling can be at a 10 kc. rate, 2½ times the highest audio frequency of 4 kc. The time frame thus is 100 microseconds, permitting 100 microseconds time slots. Although these numbers will be used for convenience in the following discussion they can be changed; for instance, in accordance with military standards having a sampling rate of 9.6 kc. at a frame time of 104 microseconds in a time slot of 1.04 microseconds. Extension of the PAM system to the PCM system requires 8 bits in the 1 microsecond time slot to be compatible with this military standard. This would then accommodate the field data (or ASCII) code or for voice, 7 bits of analog-digital conversion plus 1 control bit for signalling purposes.

Figure 2:
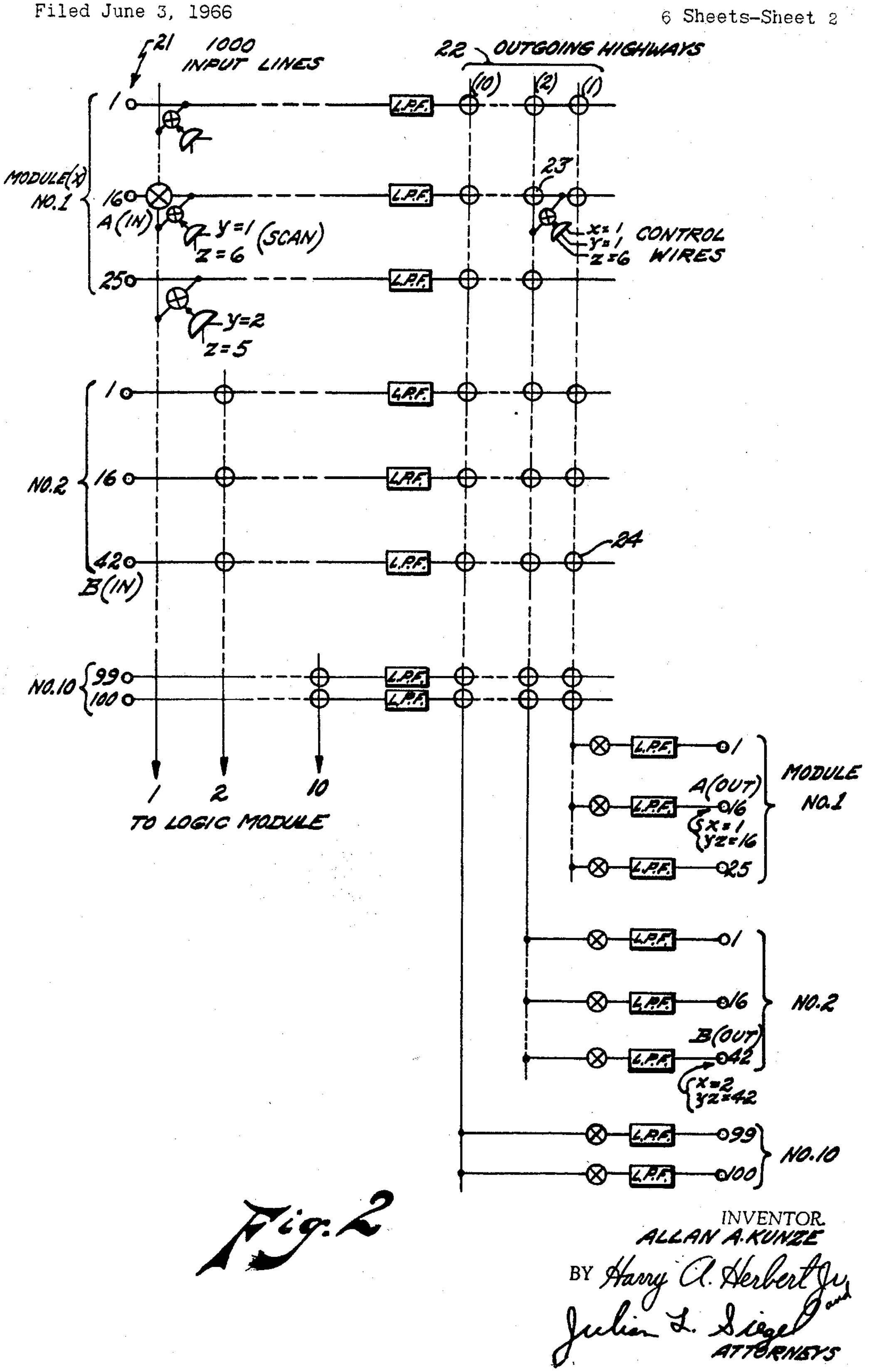
FIGURE 2 is a diagram of the switching module.

Connections are made within the switching module based on using the fixed time slot address of the subscriber as the gated interval. The 1,000 input lines 21 are each capable of being connected to the desired outgoing highway by operation of appropriate cross points in the one microsecond interval corresponding to the permanent called address as shown in FIGURE 2. Each of the 10 outgoing highways 22 is connected to an output of 100 lines; thus, the called address represents the number of highway module *x* and the time slot position on that highway *yz*. Physically this corresponds to a module deck and line position. As an example, if A, with address 116 (module 1, deck 1, line 6) wishes to talk to B, with address 242, the cross points at 23 and 24 are energized. Cross point 23 connecting A's incoming line 116 to B's highway 2 is gated to B's permanently assigned time slot 42 in order for A to talk to B. The return circuit is completed similarly by gating cross points at 24 on B's line and A's highway at A's time slot 16. The highway cross points are closed to respective output lines during their assignment slots in each time frame, whether or not they are taking part in a connection.

The switching matrix consists of up to 10 modules identified by the *x* portion of the input address. Each module has 100 input and output lines identified by the *yz* portion of the input address. Each incoming line of the matrix may be connected by cross point gates to 1 of the 10 outgoing highways identified by the *x* portion of the outgoing (or called) address in the time slot corresponding to the *yz* portion of the outgoing address. The switching matrix gates for all 10 modules require only 3 congruent pulses for activation, *xyz* of the input address, and are operated at the output time slot such as shown at 24 in FIGURE 2 or 34 in FIGURE 3 where $x=1$, $y=1$, and $z=6$, and the time slot is 42. This follows from the fact that the identity of the outgoing highway is inherent with the logic module and the outputs of the address switching memory go directly to the corresponding highways in the switching module.

Figure 3:
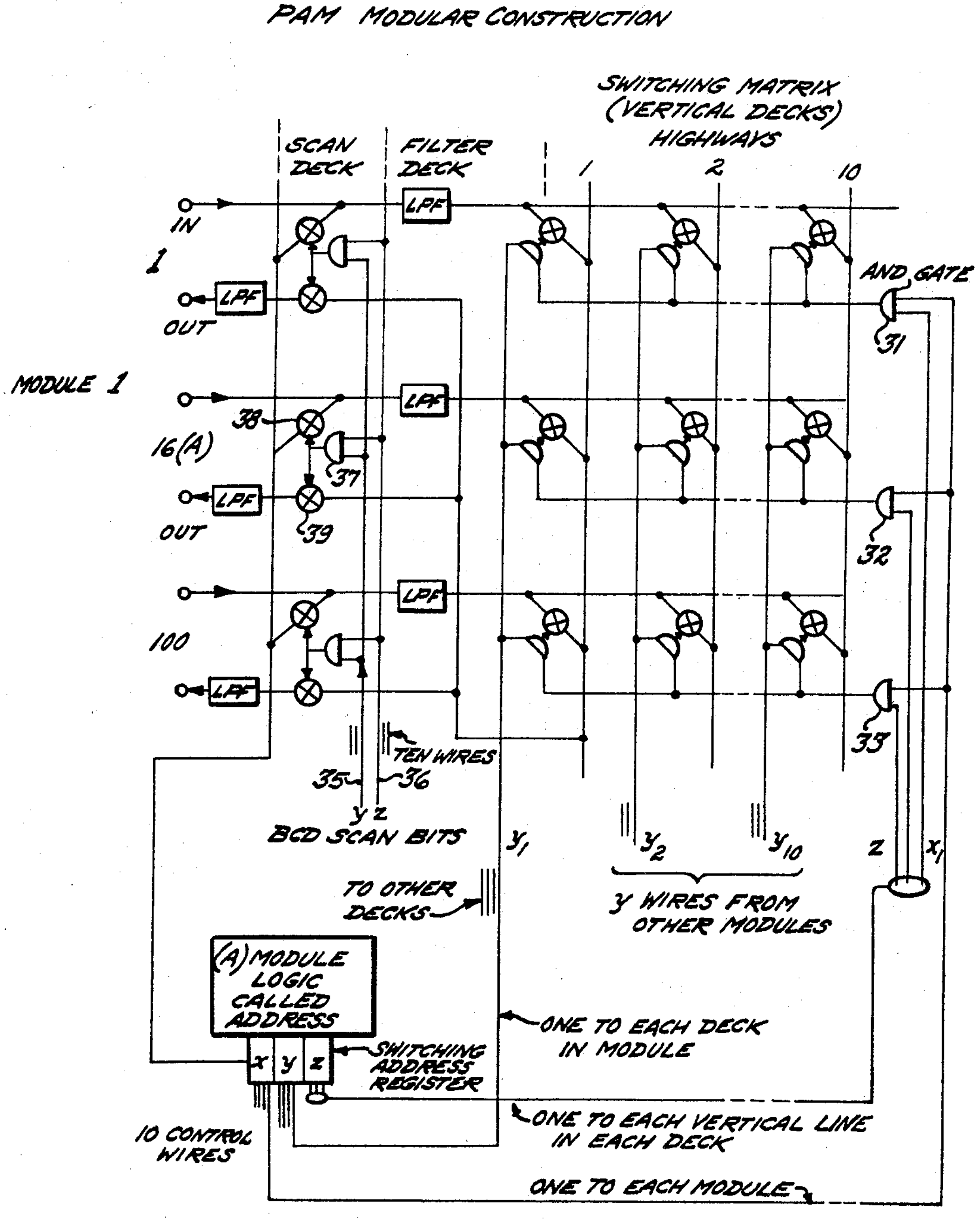
FIGURE 3 shows a switching matrix used for pulse amplitude modulation.

Basically, all corresponding highways are paralleled among the modules, and all *x, y* and *z* control wires (10 each) go to all modules in parallel. Specifically, as shown in FIGURE 3, there are 10 *x* wires from the switching address register, one going to each modue (to AND gates 31 etc.); 10 *y* wires, one going to each vertical deck (corresponding to that particular module) in parallel with the corresponding decks in other modules; and 10 *z* wires, one to each vertical position in each deck in parallel with all corresponding lines of each deck in each module. Congruent pulses at each cross point gate will then complete that circuit. That is, for subscriber A, one No. 1 wire of *x*, one No. 1 wire of *y* and one No. 6 wire of *z* at time slot 42 (as established in B's switching address register in module 2) will connect highway 2 (B's) to A's input line, so that subscriber can hear A speak.

Because of the modular design, use of external AND gates 31, 32 and 33 require only one single control wire parallel to each input line, and one wire parallel to each highway to periodically actuate all cross points as selected. This results in a much simplified switching matrix and cross point control configuration.

The scanner synchronous binary control bits are applied over 10 *y* wires (34) and 10 *z* wires (35) to AND gates (37), where, upon bit congruence, scanning gates 38 are activated to read off appropriate signalling information to the logic of that module. This information might consist of: off-hook, "dialing" address, conference call request, message traffic, long distance, hot line, priority, etc. Corresponding output gates 39 are activated at the same time to connect the output highway belonging to that module to the corresponding output line in the module. Thus, for subscriber A (address 116) congruent pulses occur on *y* wire No. 1 and *z* wire No. 6 only at time slot 16 at AND gate 37. This causes A's input line to be sampled for signalling codes, and simultaneously connects A's highway 1 to A's output line 16, in time slot 16.

Figure 4:
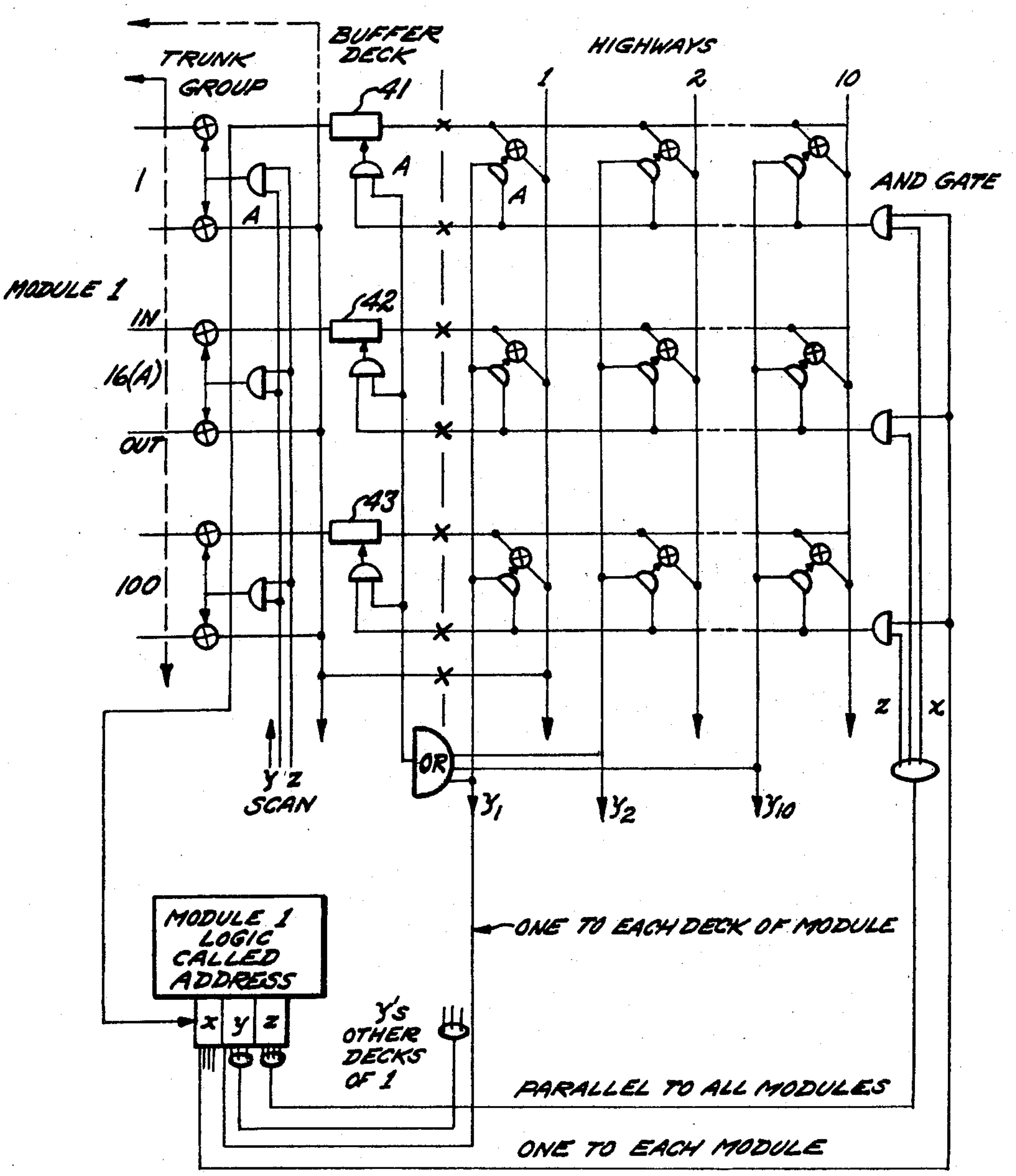
FIGURE 4 shows a switching matrix used for pulse coded modulation.

The system may be converted simply, as an evolutionary transition, from PAM (analog-voice) to PCM (digital transmissions). As shown in FIGURE 4, a deck of input-output buffers for time switching the channels as desired is substituted for the PAM deck of low pass filters in the switching matrix of each module. The cross points gates, scanning, output gating and control remain virtually unchanged. Changes to the logic itself primarily consists in the elimination of the sequencer and a number of buffers, etc. Further simplification in the PCM switching matrix is possible by superimposing the control bits directly on the highways and input lines respectively as a gating voltage pedestal.

Figure 5:
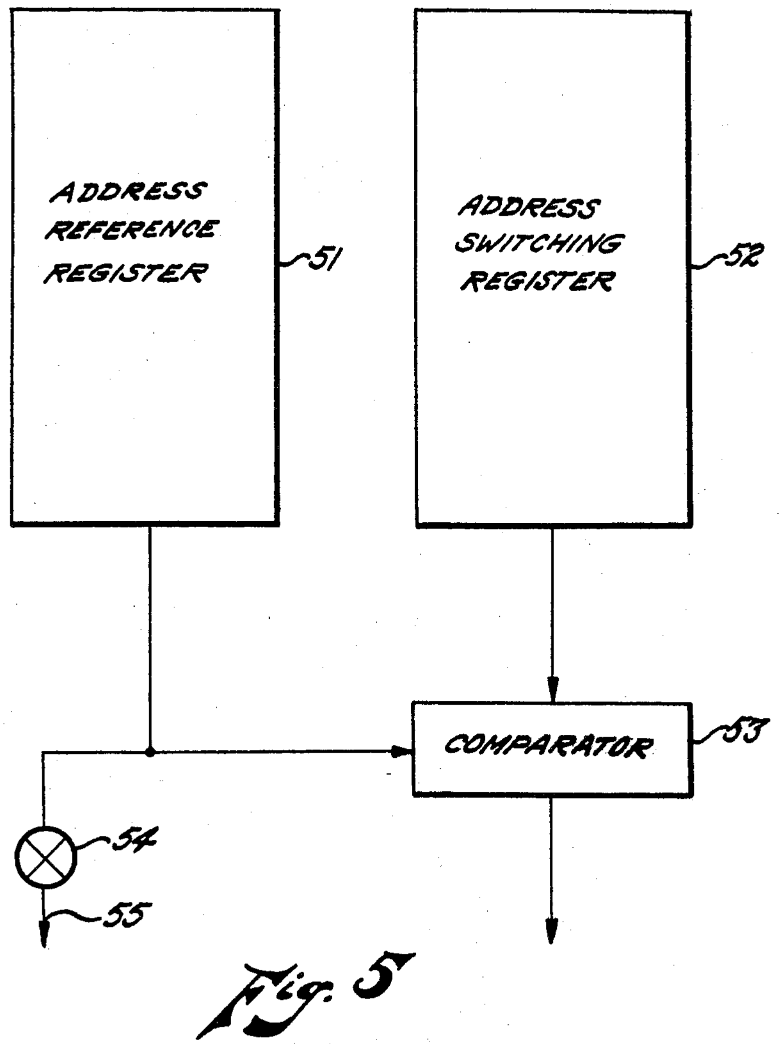
FIGURE 5 shows a reference register used to relate positional addresses with time slots.

FIGURE 5 illustrates the use of reference register 51 used for relating positional binary addresses with the corresponding time slot. Reference register 51 is a continually recycling register or binary adder, reading out Binary Coded Decimal (BCD) *yz* addresses sequentially from 1 to 100 and operates synchronously with all other registers 52 (one for each logic module) so that when it is entered by a pulse at the time slot of a desired address, the corresponding *yz* address in binary representation will be read out at 55. Conversely if the output from this register is compared with the temporary stored binary address *yz* taken from the address register and compared by comparator 53, congruency will establish the synchronous bit 54 representing the address time slot.

The basic concept of the logic associated with each module is that all signalling, control, and switching operations are accomplished in the one microsecond time slot belonging to the circuit being switched. Thus the logic can operate on all 100 circuits of the module sequentially in one time frame of 100 microseconds. Interchange of signalling and address information between modules occurs on the specific transfer bus belonging to the receiving module and in the time slot in which it will be processed in that module. Thus all functions can be located by the specific address involved and no separate individual markers or stores are required.

Figure 6:
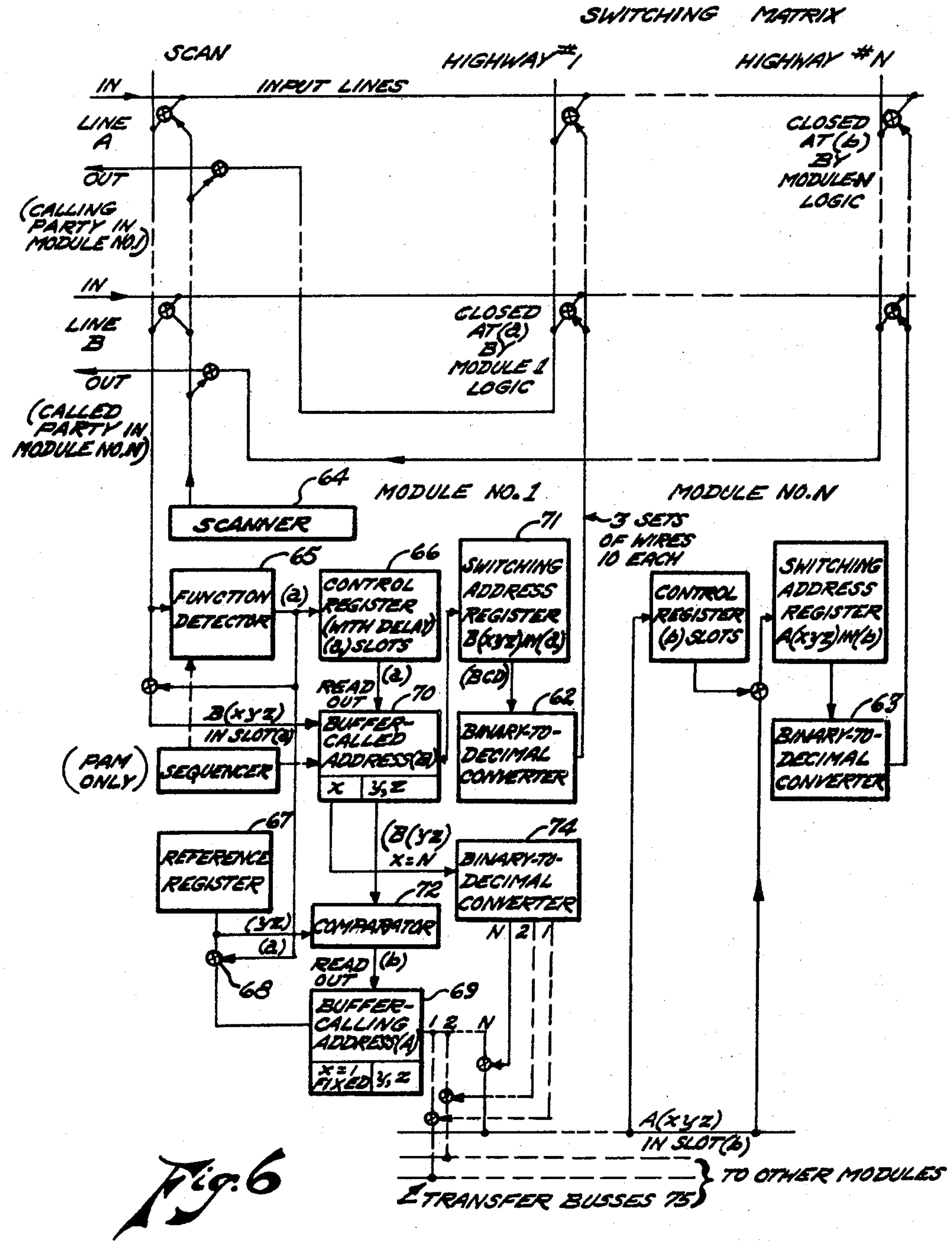
FIGURE 6 shows a block diagram of the time sharing switching system.

The address registers which control the matrix switching gates are recycling stores containing the inserted input lines $x$, $y$, $z$ BCD addresses entered at the output line's time slot location. This slot is unique to any call on a highway. Therefore the switching system is non-blocking, and up to 100 subscribers may be connected simultaneously. Two such entries are needed for a complete 2-way connection. Thus each register is required to store a possible $100 \times 4$ bits for 400 bits for a complete $x$, or $y$, or $z$ address (total store of 1200 bits). Address information is stored as binary bits at the time slot in which the information is to be used. Thus the incoming (calling party) module stores the address of the called party in the time slot belonging to the calling party and the calling address is put in the called party module address register at the called time slot. The output from each register every 100 microseconds operates the appropriate TDM switch gates in the matrix at the required time slot to switch the circuits. Binary-to-decimal converters 74, 62, and 63 of FIGURE 6 are used to convert the stored BCD information to the decimal form required to direct the prescribed one microsecond pulses to the corresponding cross points or to direct addresses to proper transfer busses. These converters might consist of the familiar tree configuration logic.

Other registers associated with and operating synchronously with the address memory are priority, control, busy, and ring. Bits inserted in these are entered at the time slot of the appropriate party in their respective recirculating registers, the busy and ring registers outputs are used to gate the output highways with which they are associated into the busy and ring generator, respectively. Thus the required status tone will appear at the appropriate receiver; that is, the same highway and slot.

The input lines are scanned by scan generator 64 of FIGURE 6 in sequence once every time frame to denote change in status (on hook-off hook) according to the physical $y$, $z$ location of the line. The status indication of each time slot is sent on a common line to function detector 65 in the control logic associated with the incoming module.

Operationally, the function detector 65 recognizes off hook signal (tone or symbol) from scanner 64 in time slot $a$ corresponding to calling party's address $yz$ and puts a synchronous bit in that time slot $a$ in control register 66 establishing the time slot address of the calling party for the duration of the call. At the same time $a$, the calling party's A's BCD address $yz$, is read out of the reference register 67 by opening gate 68 during $a$, into the calling address buffer 69, the $x$ part of A's address is permanently stored in buffer 69 as it belongs uniquely to module 1.

Simultaneously, bit $a$ reads out called ("dialed") address B($xyz$) from scanner 64 into buffer 70 in time slot $a$. (Note that entry is made in same time slot as it will be inserted in switching address register 71, so that for PCM where addresses can be alpha-numeric characters, the address can be entered into register 71 directly, eliminating necessity for buffer 70.) When called party address is completely assembled in buffer 70 (time depends on signalling or dialing technique), the control register 66 with incorporated time delay causes the called address information [B($xyz$)] when completely assembled to be read into recirculating switching address register 71 in synchronous time slot $a$ belonging to calling party A in module 1. At the same time, the $yz$ portion of the called address is compared in comparator 72 to the synchronously running (1 to 100) addresses from reference register (or binary adder) 67. Upon congruence, a pulse in time slot $b$ corresponding to the called address causes buffer 69 to read out the calling party address A($xyz$) in time slot $b$. At the same time, $b$ pulse reads $x$ part of B's address through gate 73 into binary to decimal converter 74, whose output then operates the proper gate to direct address A($xyz$) to the desired module N containing called party B. That is, calling party's address A($xyz$) is sent to module N over N's unique transfer bus 75 in the unique time slot $b$ in which all logic operations in module N will be performed. A($xyz$)—(after checking for busy status) is entered directly into N's switching address register in time slot $b$—the slot in which it is received in module N. A bit is also inserted in module N's control register at time slot $b$ to identify B's address.

Output wires from both switching address registers (4 for $x$, 4 for $y$, and 4 for $z$) go to their respective binary to decimal converters 62 and 63 where the information is converted to 3 sets of 10 wires each ($x$, $y$, $z$ decimal). The output wires from all converters are then parallel and sent to the switching matrix. Here with proper use of "and" gates, control of all 1000 lines can be accomplished by a single wire paralleling each input line in the matrix and another line paralleling each highway. In the case of PCM, control can also be accomplished directly over the lines and highways by establishing a voltage pedestal at the desired cross point, effectively closing that gate.

Idle address buffer is energized to receive the dialed address of the called party in the form of PAM sampling of the dial tones in the calling time slot ($y$, $z$). Thus the scanning operation involves both recognition of change in status and preparation for the extraction of dialing information. In the case of PCM switching signalling is accomplished alpha-numerically so that the sequencer and analog-digital converters in the PAM case are not required. The scanning operation is accomplished for all modules simultaneously, sampling a given line ($y$, $z$) address in each module concurrently from a common scan generator. The same control pulses are also used to gate the fixed highway output for all time slots and modules.

This information may be expanded to include concentrators, a flexible conference call feature, and a message switching capability utilizing the idle time during voice communications. The method used in keeping track of called addresses also lends itself to the incorporation of a saturation signalling function to afford a near instantaneous hot line operation when the location of a called party is indeterminate.

What I claim is:

1. A time division non-blocking switching system having logic, control and cross-point switching memory integrated with a switching matrix in an expandable modular configuration comprising:

(a) a plurality of $x$ switching matrix modules, each module having
  (1) an $x$ outgoing highway;
  (2) a plurality of $yz$ input lines and $yz$ output lines, the $yz$ output lines each having a unique time slot;
  (3) and energizable cross-points for connecting the $xy$ input and output lines to the highway;
(b) means for scanning the input lines and gating the output highways sequentially at fixed time slots corresponding to the output address;
(c) a function detector connected to the input lines for recognizing signal functions;
(d) a control register fed by the function detector for establishing time slots;
(e) a recirculating switching address register for each module containing the $yz$ output line address entered at the input time slot for energizing the cross points;
(f) and a binary-to-decimal converter interposed between the switching address register and the cross points.

2. A switching system according to claim 1 which further comprises:

(a) a continually recycling reference register sequentially reading out *yz* binary addresses;

(b) a reference register gate activated by the function detector;

(c) a calling address buffer for storing a binary address upon activation of the reference register gate;

(d) and a comparator fed by the reference register and control register and having an output for causing the calling address buffer to read out the calling party address in the desired time slot.

3. A switching system according to claim 1 which further comprises: a plurality of low-pass filters connected to the input lines for use as pulse amplitude modulation.

4. A switching system according to claim 1 which further comprises: a plurality of buffer stores connected to the input lines for use pulse coded modulation.

References Cited

UNITED STATES PATENTS

| | | | |
|---|---|---|---|
| 3,332,067 | 7/1967 | Bacon | 340—172.5 |
| 3,331,055 | 7/1967 | Betz et al. | 340—172.5 |
| 3,302,182 | 1/1967 | Lynch et al. | 340—172.5 |
| 3,300,763 | 1/1967 | Hoehmann | 340—172.5 |
| 3,299,261 | 1/1967 | Steigerwalt | 235—175 |
| 3,289,180 | 11/1966 | Loughhead | 340—174 |
| 3,274,561 | 9/1966 | Hallman et al. | 340—172.5 |
| 3,274,554 | 9/1966 | Hopper et al. | 340—172.5 |
| 3,243,582 | 3/1966 | Holst | 235—150.4 |
| 3,241,124 | 3/1966 | Newhouse | 340—172.5 |
| 3,212,064 | 10/1965 | Krieger | 340—172.5 |

PAUL J. HENON, *Primary Examiner.*

GARETH D. SHAW, *Assistant Examiner.*